United States Patent [19]

Gross et al.

[11] 4,385,985

[45] May 31, 1983

[54] FCC REACTOR WITH A DOWNFLOW REACTOR RISER

[75] Inventors: Benjamin Gross, Cherry Hill; Michael P. Ramage, Moorestown, both of N.J.

[73] Assignee: Mobil Oil Corporation, New York, N.Y.

[21] Appl. No.: 254,329

[22] Filed: Apr. 14, 1981

[51] Int. Cl.³ .......................................... C10G 11/18
[52] U.S. Cl. .................................. 208/113; 208/120; 208/164; 252/417; 422/142; 422/145
[58] Field of Search .............. 208/113, 120, 153, 164, 208/165, 176; 422/142, 145

[56] References Cited

U.S. PATENT DOCUMENTS

| | | | |
|---|---|---|---|
| 2,282,855 | 5/1942 | Egloff | 208/183 X |
| 2,965,454 | 12/1960 | Harper | 208/151 X |
| 3,074,878 | 1/1963 | Pappas | 208/127 |
| 3,120,484 | 2/1964 | Mills et al. | 208/150 X |
| 3,492,221 | 1/1970 | Pfeiffer | 208/164 |
| 3,565,790 | 2/1971 | Schwarzenbek | 208/153 |
| 3,607,126 | 9/1971 | Pfeiffer | 208/153 X |
| 3,607,730 | 9/1971 | Pfeiffer | 208/164 |
| 3,826,738 | 7/1974 | Zenz | 208/153 |
| 3,835,029 | 9/1974 | Larson | 208/153 X |
| 4,283,273 | 8/1981 | Owen | 208/113 |

Primary Examiner—Delbert E. Gantz
Assistant Examiner—G. E. Schmitkons
Attorney, Agent, or Firm—Charles A. Huggett; Michael G. Gilman; Stanislaus Aksman

[57] ABSTRACT

A fluid catalytic cracking (FCC) process and apparatus using a riser and a reactor for cracking of petroleum feeds in the presence of a catalyst and a regenerator for regenerating the spent catalyst are improved by providing a downflow riser. The downflow riser assures uniform distribution of the catalyst throughout the feed, decreases contact time of the catalyst with the feed and decreases the amount of coke made in the process.

9 Claims, 9 Drawing Figures

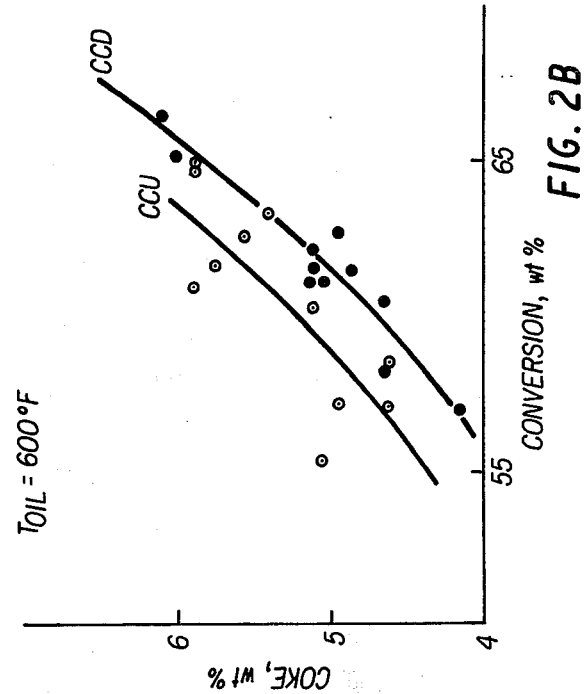
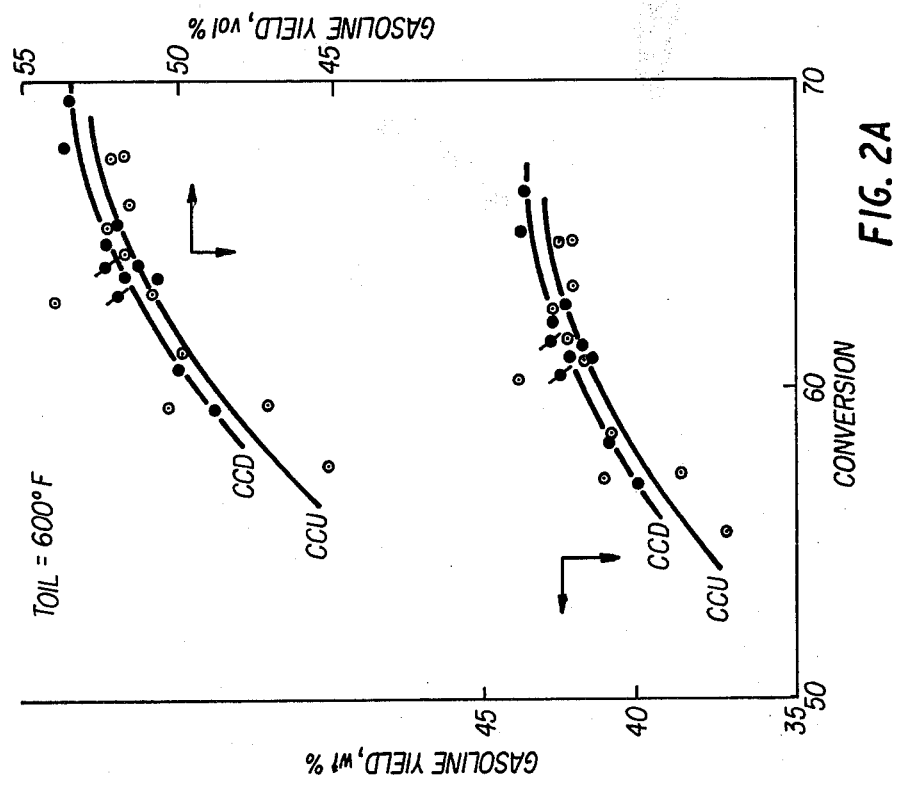
FIG. 2A, FIG. 2B — Gasoline selectivity and coke make for 600°F preheat level

FIG. 2C

KEY TO SYMBOLS USED IN FIGURES 3 THROUGH 10

CCD CO-CURRENT DOWNFLOW
CCU CO-CURRENT UPFLOW $T_{OIL} = 600°F$

- ⊙ CCU; INERTS ≈ 1.3 wt%
- ● CCD; → INERTS ≈ 2.3 wt%

$T_{OIL} = 900°F$

- ⊡ CCU; INERTS ≈ 1.3 wt%; $T_{mix}$ ≈ 1035°F
- ◇ ; $T_{mix}$ ≈ 990°F
- ■ CCD; ; $T_{mix}$ ≈ 1035°F
- ◆ ; $T_{mix}$ ≈ 990°F
- ; → INERTS ≈ 2.7 wt%; $T_{mix}$ ≈ 1035°F

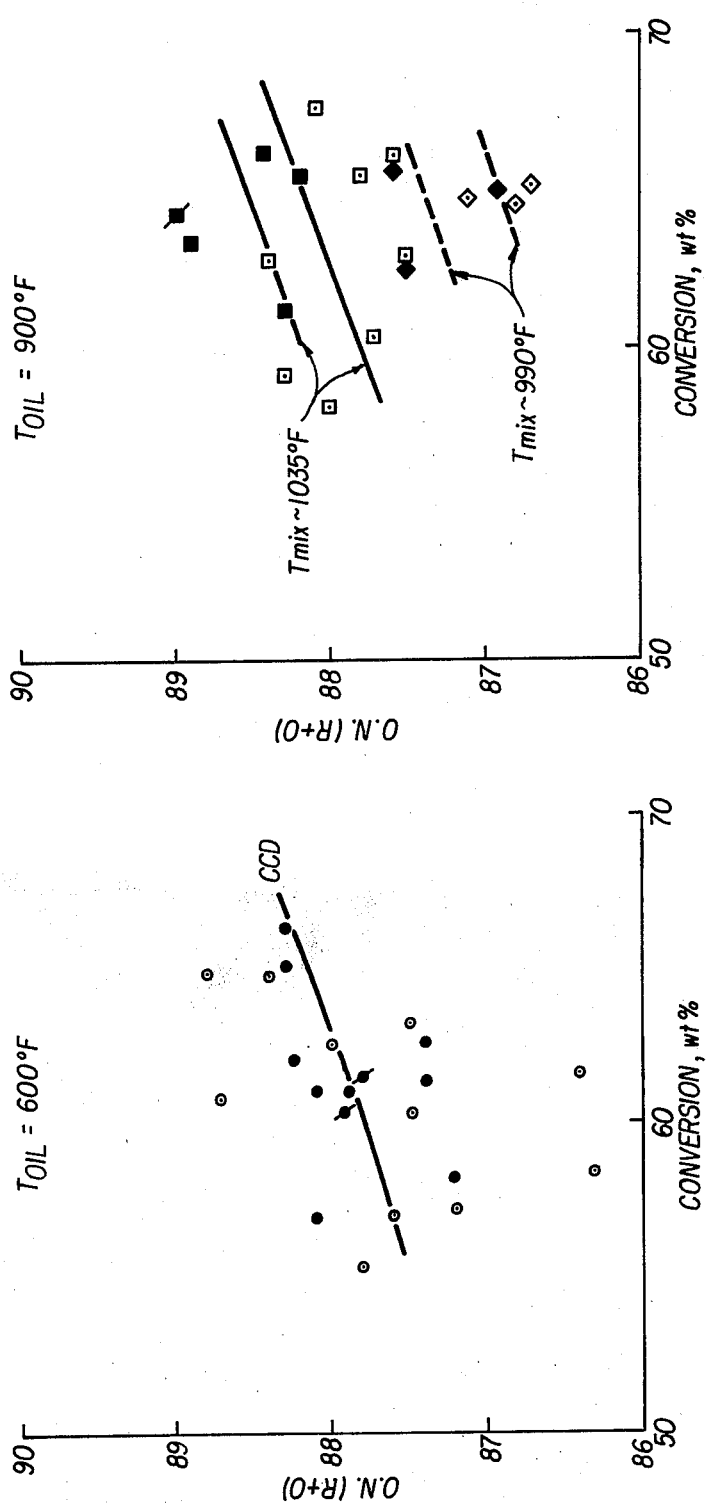

RECORDER TRACING OF RISER INLET PRESSURE

FCC REACTOR WITH A DOWNFLOW REACTOR RISER

BACKGROUND OF THE INVENTION

1. Field of the Invention

This invention relates to catalytic cracking of petroleum fractions. More particularly, this invention relates to an improved process, and the apparatus used therein, for converting gas oils and heavy petroleum fractions into valuable hydrocarbon products, such as gas, gasoline, light cycle gas oil and heavy cycle gas oil, with reduced coke formation in a fluid catalytic cracking reactor.

2. Description of Prior Art

Conversion of various petroleum fractions to more valuable products in catalytic reactors is well known in the art. The petroleum industry has found the use of a fluid bed catalytic cracker reactor (hereinafter FCC reactor) particularly advantageous for that purpose. An FCC reactor typically comprises a thermally balanced assembly of apparatus comprising a reactor vessel filled with a catalyst and a regenerator vessel wherein spent catalyst is regenerated. The feed is converted in the reactor vessel over the catalyst and coke simultaneously forms on the catalyst, thereby deactivating the same. The deactivated (spent) catalyst is removed from the reactor vessel and conducted to the regenerator vessel, wherein coke is burned off the catalyst with air, thereby regenerating the catalyst. The regenerated catalyst is then recycled to the reactor vessel. The reactor-regenerator vessel assembly must be maintained in steady state heat balance so that heat generated by burning the coke provides sufficient thermal energy for catalytic cracking in the reactor vessel. The steady-state heat balance is usually achieved and maintained in the FCC reactors by controlling the rate of flow of the regenerated catalyst from the regenerator to the reactor. The rate of catalyst flow is normally controlled by means of a slide valve in the regenerator-to-reactor conduit. The degree of opening of the slide valve is controlled by a conventional controlling means coupled to a temperature sensing means (e.g., a thermocouple), placed at the top of the reactor, to maintain the desired temperature inside the reactor.

The product stream of the catalytic cracker is usually fractionated into a series of products, including: gas, normally conducted to gas concentration plant; gasoline; light cycle gas oil; and heavy cycle gas oil. A portion of the heavy cycle gas oil is usually recycled into the reactor vessel and mixed with fresh feed. The bottom effluent of the fractionator is conventionally subjected to settling and the solid portion of the settled product is also recycled to the reactor vessel in admixture with the heavy cycle gas oil and feed.

In a prior art version of fluid catalytic cracking reactor, the regenerated catalyst is introduced into the base of a riser column (also known as transport reactor) in the reactor vessel. The riser column serves a two-fold purpose: (1) to transfer the catalyst from the regenerator to the reactor, and (2) to initiate cracking of the petroleum feed. The regenerated hot catalyst is admixed in the bottom of the riser column with a stream of fresh feed and recycled petroleum fractions, and the mixture is forced upwardly through the column. During the upward passage of the catalyst and of the petroleum fractions, the petroleum is cracked and reformed, and coke is simultaneously deposited on the catalyst. The fluid bed of the coked catalyst and of the cracked and reformed petroleum components is passed upwardly out of the riser and through a solid-gas separation system, e.g., a series of cyclones, at the top of the reactor. The cracked petroleum fraction is conducted to product separation, while the choked catalyst passes to the regenerator vessel and is regenerated therein, as discussed above.

In the prior art design of the riser (see e.g., Pfeiffer, U.S. Pat. No. 3,492,221; Pfeiffer, U.S. Pat. No. 3,607,126 and Schwarzenbek, U.S. Pat. No. 3,565,790), the petroleum feed must be contacted with the catalyst for a relatively long period of time to effect efficient conversion and cracking of the feed. The relaively long contact time is necessitated by the upflowing configuration of the riser which requires acceleration of the catalyst from an essentially stationary position to the feed velocity against the downward force of gravity. This causes commonly encountered problems in the upflow reactor riser, such as backmixing of the catalyst and non-uniform distribution thereof through the feed.

In addition, some petroleum feeds, e.g., gas oils and hydrotreating (HDT) vacuum residues, have a natural tendency to form high quantities of coke, thereby sacrificing the yield of gasoline-grade products. This tendency leads to time consuming and sometimes inefficient operation of the regenerating vessel and, in extreme cases, to an upset of the steady-state heat balance equilibrium. Due to relatively long contact time and inefficient contacting of catalyst and petroleum feeds in the prior art upflow reactor riser, the tendency of the aforementioned petroleum feeds to form excessive amounts of coke at the expense of gasoline-grade products is even more pronounced. Further details of FCC processes can be found in U.S. Pat. Nos. 2,383,636 (Wurth); 2,689,210 (Leffer); 3,338,821 (Moyer et al); 3,812,029 (Snyder, Jr.); 4,093,537 (Gross et al); 4,118,337 (Gross et al); and 4,118,338 (Gross et al); as well as in Venuto et al, *Fluid Catalytic Cracking with Zeolite Catalysts*, Marcel Dekher, Inc. (1979). The entire contents of all of the above patents and publications are incorporated herein by reference.

Accordingly, it is a primary object of the present invention to decrease contact time of catalyst and petroleum feed, thereby improving the efficiency of contact of the catalyst and the feed.

Another object of this invention is to effect a rapid separation of the catalyst from the feed after the completion of the reaction in the riser.

It is an additional object of this invention to improve conversion-coke selectivity of the FCC plant, thereby decreasing the relative amount of coke produced in the plant.

It is yet another object of this invention to increase catalyst efficiency and increase gasoline selectivity in the FCC plant.

It is yet another object of this invention to improve octane rating of the gasoline produced in the FCC plant.

Another object of this invention is to provide an improved apparatus for the FCC plant wherein the riser of the reactor vessel is placed on top of the reactor vessel in such a manner that it forces the downflow movement of the regenerated catalyst mixed with the petroleum feedstock.

Additional objects and advantages of this invention will become apparent to those skilled in the art from the study of the specification and of the appended claims.

SUMMARY OF THE INVENTION

These and other objects have been attained according to this invention by providing an FCC reactor vessel with a riser (or transport reactor) attached to the top of the reactor vessel in such a manner that the regenerated catalyst is forced to flow in a downward direction from the regenerator vessel into the reactor. The downflow reactor riser substantially eliminates the problems of back mixing of catalyst and non-uniform distribution thereof throughout the petroleum feedstock. The petroleum feedstock is introduced into the riser either at a point of introduction of the regenerated catalyst into the riser, or immediately downstream of that point, as in a conventional prior art upflow riser. The downward direction of the flow of the catalyst and of the feed facilitates uniform distribution of the catalyst throughout the feed in a relatively short time, thereby decreasing coke make and enabling rapid separation of the catalyst from the converted feedstock at the bottom portion of the riser. After exiting from the riser, the products of the reaction are separated from the spent catalyst in a conventional manner, e.g., by a series of cyclones in the reactor vessel, and the spent catalyst is then conducted to the regenerator vessel. The net result of providing a downflow riser in the FCC plant reactor is decreased amount of coke produced in the process, increased gasoline selectivity of the process, production of higher octane gasoline at substantially the same gasoline efficiency, and increased catalyst efficiency.

BRIEF DESCRIPTION OF THE DRAWINGS

FIG. 2 is a comparative graph of gasoline and coke make of the co-current upflow (CCU) and co-current downflow (CCD) riser configurations at 600° F. oil preheat temperature.

FIG. 5 is a comparative graph of octane number (O.N.) as a function of oil feed conversion with the CCU and CCD risers at 600° F. and 900° F. oil preheat temperatures.

DETAILED DESCRIPTION OF THE INVENTION

Figure 1:
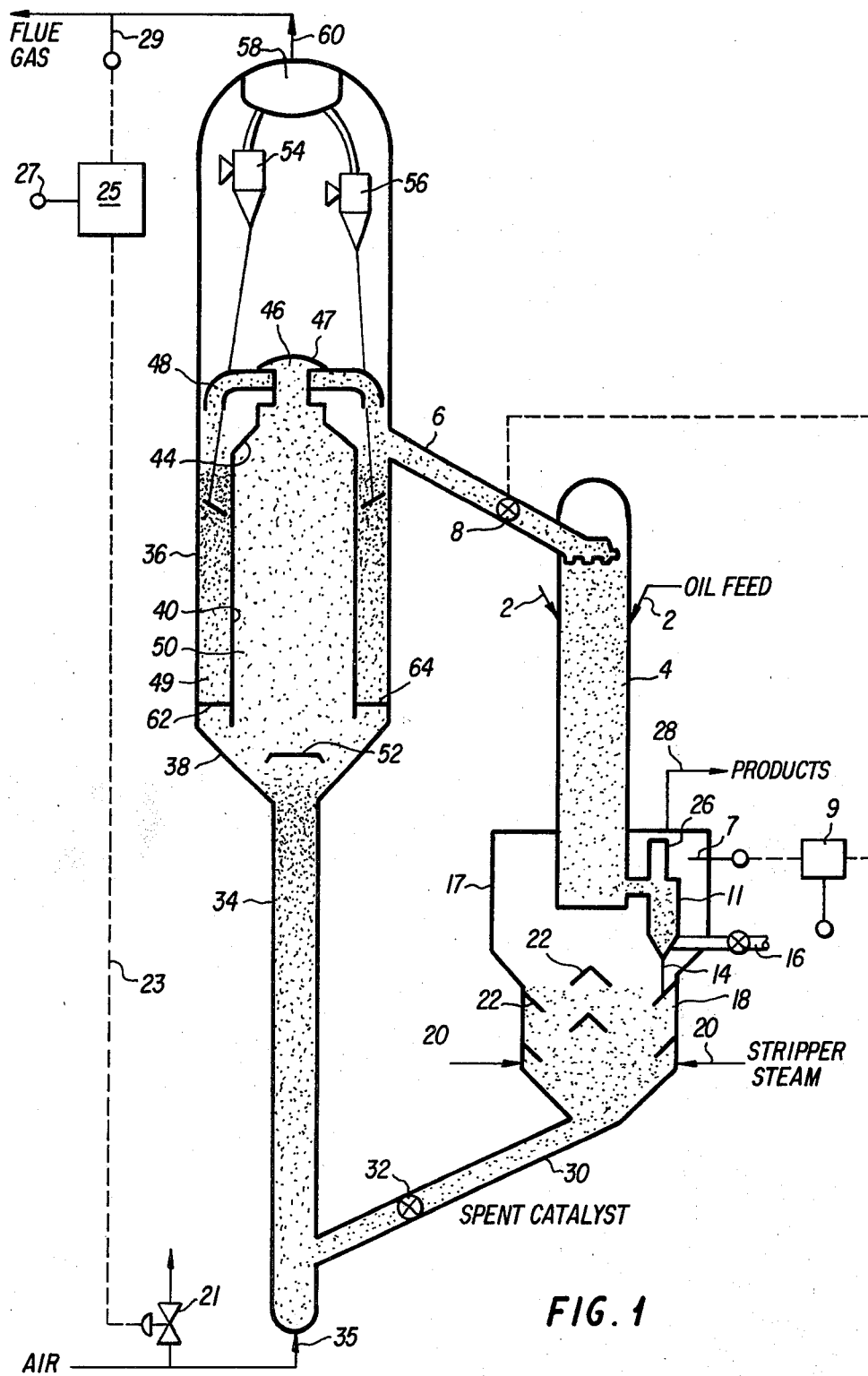
FIG. 1 is a schematic representation of the FCC plant, with an exemplary regenerator design, incorporating the downflow riser in the reaction vessel.

The regenerated catalyst is removed from the regenerator vessel by conventional means, e.g., a downwardly directed conduit or stem-pipe with a slide valve. The slide valve is controlled in a conventional manner by a control loop comprising a temperature sensing means, such as a thermocouple, in the upper portion of the reactor vessel and a controller with a set point. The set point of the controller is set at such a setting as to maintain the temperature in the uppermost portion of the FCC reactor at below about 1000° F. If the temperature exceeds the set point, the slide valve in the regenerator-to-reactor conduit is activated to decrease the rate of flow of the hot regenerated catalyst from the regenerator into the reactor. The regenerator-to-reactor conduit terminates in the downflow reactor riser. The conduit is equipped at its exit end with a means facilitating efficient and uniform distribution of the catalyst throughout the cross-sectional area of the riser, comprising, for example, a circular perforated disc covering the cross-sectional area of the riser with perforations large enough to allow egress of the regenerated catalyst from the disc, or a multi-nozzle catalyst feed nozzle. The downflow riser is also equipped with a petroleum feedstock introduction means, e.g., conventional feedstock injection nozzles, placed in the immediate vicinity of the point of introduction of the regenerated catalyst into the riser. The construction of the riser is similar to that used in the upflow risers of the prior art, except, of course, that it is attached to the upper section of the reactor vessel, thereby forcing downward flow of the regenerated catalyst and of the petroleum feed. The riser is made of conventional materials of construction, e.g., stainless steel, carbon steel or low chrome and molybdenum content steel, both with suitable refractory lining materials.

The dimensions of the riser are also similar to the dimensions of the prior art upflow risers. Thus, a typical riser is 120 feet in length, and has a cylindrical shape with an inside diameter of 20–70 inches. The superficial velocity of the petroleum feedstock in the riser is about 5 ft/sec. to about 50 ft/sec., preferably about 10 ft/sec. to about 40 ft/sec., and most preferably 15 ft/sec., to about 35 ft/sec.. The inside surface of the riser may also optionally be equipped with baffles to facilitate more thorough mixing of the regenerated catalyst with the feed and to provide means for controlling residence time of the feed in the riser. The residence time in the downflow riser varies from 0.2 seconds (sec) to 10 sec, preferably 0.3 sec. to 4 sec., most preferably 0.4 sec. to 2 sec. According to preliminary calculations, in an FCC process using gas oil as the feed, residence time can be reduced from about 5 sec in an upflow riser to about 2 sec in a downflow riser at otherwise identical process conditions. The decrease results in 20 to 30 percent less coke make; in about 20 percent less catalyst for the same conversion; and, in about 1 percent more gasoline at the same conversion.

The catalyst and petroleum feedstock mixture travels rapidly to the reactor where the catalyst and products of the reaction are quickly separated from each other. Coke is deposited on the catalyst as a by-product of the reaction. The now spent catalyst (i.e., coked catalyst) is transferred to the reactor stripper which steam-strips entrained hydrocarbons from the catalyst and returns the hydrocarbons to the reactor for recovery. The recovery of the hydrocarbons removed from the catalyst and those produced in the cracking process during the passage of the feedstocks through the riser and through the reactor is accomplished in a solid-gas separation system, e.g., a series of cyclones at the top of the reactor. The cracked petroleum fraction is conducted to product separation, while the coked catalyst passes to the regenerator vessel and is regenerated therein as in the prior art FCC plants. Any conventional previously known regenerator vessel can be used with the improved process and apparatus of this invention. Accordingly, the placement of the regenerator-to-reactor conduit will depend on the type of the regenerator used. However, the placement of the conduit for every design of the regenerator will be such that it insures a steady and continuous flow of the substantially regenerated catalyst into the riser.

The process of this invention can be operated with any feedstock material conventionally used in FCC plants. Thus, suitable feed materials include such hydrocarbon feedstocks as naphthas, gas oil, vacuum gas oil, light and heavy distillates, residual oils and the like. However, due to the fact that the downflow reactor riser configuration of this invention minimizes the choke formation and increases the gasoline selectivity of the catalyst, preferred feedstocks for the process of this invention are those feedstocks which normally have a relatively high propensity to form coke in FCC processing operations. Such preferred feedstocks are generally heavier stocks, e.g., Arab heavy oil, HDT (hydrotreated) vacuum residues and gas oils. As used herein, heavy oil feedstocks are those feedstocks which are characterized by high endpoints (greater than 1050° F.), high CCR contents (3% or more) and high amounts of multi-ring aromatic compounds (more than about 15%).

Similarly, although, as stated above, any regenerator vessel design can be used with the improved process and apparatus of this invention, it is particularly preferred to use fast fluidized regenerator vessels because they provide efficient regeneration of the spent catalyst in a relatively short period of time, and therefore they are more compatible with the downflow riser design of this invention which reduces residence time of the catalyst in the reactor riser. The design and operation of one fast fluidized regenerator is set forth in detail in U.S. Pat. No. 4,118,338, issued to Gross et al, on Oct. 3, 1978 and briefly summarized below in conjunction with the discussion of the design and operation of one embodiment of this invention shown in FIG. 1.

The process of this invention can be used in conjunction with any catalyst conventionally used in the FCC processes, e.g., zeolites, silica-alumina, and zeolites with carbon monoxide burning promoters. Such carbon monoxide burning promoters or carbon monoxide burning catalysts include: platinum metals, e.g., platinum, palladium, rhodium, ruthenium, iridium, and osmium; and, rhenium. The catalyst is provided with a carbon monoxide oxidation promoter in an amount particularly promoting the combustion of formed carbon monoxide to carbon dioxide within the regenerator. The oxidation promoter may be added in the form of separate discrete particles or it may be incorporated in the cracking catalyst employed in the FCC plant. The details of the composition and the method of incorporation of the carbon monoxide-burning promoter are disclosed in detail in U.S. Pat. Nos. 4,072,600 and 4,093,535, the entire contents of which are incorporated herein by reference.

In reference to FIG. 1, exemplifying one of the embodiments of the present invention, a hydrocarbonaceous feed, e.g., gas oil or higher boiling material is introduced through a conduit 2 to the top section of riser reactor 4. Hot regenerated catalyst is also introduced to the top section of the riser by a stem pipe 6 equipped with a flow control valve 8. The degree of opening of the valve 8 is controlled by a control loop comprised of a temperature sensing means 7 at the top of the reactor 16 and a controller 9, of the conventional type. A vapor liquid suspension is formed in the top section of the riser 4 at an elevated temperature of about 950° F., and usually at about 980° F. The temperature range of the suspension may vary from 980° F. to 1200° F. and is usually at least 1000° F., depending on the degree of the hydrocarbon conversion desired and on the composition of the feed. The suspension formed in the riser is passed downwardly through the riser under selected temperature and residence time conditions. The residence time of the hydrocarbon charge stock in the riser is about 0.2 to about 10 seconds, preferably about 0.3 to about 4 seconds, before the suspension passes through suitable separating means, such as a series of cyclones 11 (shown for clarity in FIG. 1 as a single cyclone), rapidly effecting separation of catalyst particles from vapor hydrocabon conversion products. The separator means 11, along with the end of the riser 4 is housed in a larger, upper section of the reactor, designated herein as a receiving and catalyst collecting vessel 17. Catalyst particles separated in the cyclone 11 pass countercurrently in contact with stripping gas introduced by conduit 16 to a lower portion of the cyclone. The thus contacted and separated catalyst is withdrawn by a dipleg 14 for discharge into a bed of catalyst in the lower section of the reactor.

The lower section of the reactor vessel 17 has generally a smaller diameter than the upper portion thereof and it comprises a catalyst stripping section 18 into which a suitable stripping gas, such as steam, is introduced, e.g., by a conduit 20. The stripping section is provided with a plurality of baffle means 22 over which the downflowing catalyst passes counter-currently to the upflowing stripping gas.

A conventional separating means, not shown for clarity, is provided in the upper portion of the vessel 17 for recovering stripped hydrocarbon products and stripping gas from entrained catalyst particles. As is well known in the art, there may also be provided a second sequential stage (not shown in FIG. 1 for clarity) of catalyst separation for product vapors discharged from the separator 11 by conduits 26 and 28.

Stripped catalyst comprising carbonaceous deposits of the riser conversion section is withdrawn from the bottom of the stripping section at an elevated temperature, e.g., at 1000° F., by a standpipe or conduit 30 equipped with a flow control valve 32. The catalyst is then passed from the standpipe 30 into the bottom portion of the regenerator riser 34. A lift gas is introduced into the bottom of riser 34 through a conduit 35. the lift gas can be, e.g., a preheated air, hot flow gas, oxygen supplemented flow gas, at about 300° to 500° F. and about 40 psig. The amount of lift gas introduced into the regenerator riser is sufficient for forming a suspension of the catalyst in the lift gas, which suspension is forced to move upwardly through the riser 34 under incipient or partial regenerator conditions and into the bottom portion of an enlarged regenerator vessel 36. An inverted circular cup plate 52 may be used if desired to accomplish the distribution of the suspension. Regenerator vessel 36 comprises a bottom closure member 38 shown in the drawing to be conical in shape. Other suitable shapes obvious to those skilled in the art, may also be employed, such as rounded dish shapes.

The regenerator vessel 36 comprises in the lower section thereof a smaller diameter cylindrical vessel means 40 provided with a cylindrical bottom containing a cylindrical opening in the bottom thereof, whose cross-section is at least equal to the cross-section of the riser 34. An outer annular space 49 is formed by the chamber 36 and by the vessel 40, and it serves to recirculate regenerated catalyst.

Vessel 40 is provided with a conical head member 46 terminating in a relatively short cylindrical section of a sufficient vertical height, and capped at its upper end by means 47 to accommodate a plurality of radiating arm means 48. The radiating arm means 48 are opened in the bottom side thereof because they are "U" shaped tunnels in cross-section and operate to discharge a concentrated stream of catalyst substantially separated from combustion product gases generally downward into the space 49. A substantial portion, e.g., 50 percent, of the regenerated catalyst discharged by the arms 48 is conducted into the stem pipe 6 and then into the downflow riser 4. Vessel 40 is herein referred to as the combustor vessel because in this portion of the regenerator the combustion of carbonaceous material and of the carbon monoxide formed during the combustion is particularly promoted. As stated above, the catalyst used in the process may incorporate a carbon monoxide (CO)-burning promoter, e.g., platinum, palladium, iridium, osmium, rhodium, ruthenium and rhenium.

In the upper portion of vessel 36, a plurality of cyclonic separators 54 and 56 is provided for separating combustion flue gases from entrained catalyst particles. The separated flue gases pass into plenum 58 for withdrawal by a conduit 60. If significant combustion of carbon monoxide takes place in the upper portion of vessel 36, above the annulus 44, a heat absorbing catalyst may be used in the process to improve the heat recovery efficiency of the operation.

The regenerator vessel described above, and shown in FIG. 1, and the method of operation thereof is designed to maintain during operation a substantial mass or bed of fluid regenerated catalyst particles in the outer annular zone 49. Fluidizing gas (i.e., regenerating medium), which usually contains oxygen to achieve complete combustion of carbonaceous deposits on the catalyst, is introduced into the lower portion of the annular zone or segments of the annular zone by conduits 62 and 64. The designation "segments" is intended to mean that only selected vertically oriented portions of the annular section beneath the discharge of radiating arms 48 will contain regenerated catalyst. Thus, with this arrangement, the volume of regenerated catalyst retained in the annular zone 49 can be considerably reduced over that retained by using the total annulus. On the other hand, sufficient amount of regenerated catalyst must be retained by the annular zone 49 to permit the method of operation described herein and to maintain the heat balance between the reactor vessel and the regenerator vessel. The catalyst regenerator operation illustrated herein is designed to provide regenerated catalyst at an elevated temperature above 450° F. and preferably at 1300° to 1500° F., having residual coke on catalyst of less than about 0.15 and preferably 0.01 to 0.05 weight percent. However, the process of the present invention can be successfully used with any regenerator operation coupled to an FCC reactor. Accordingly, the regenerator operation illustrated in the embodiment of FIG. 1 is used as an example of one suitable regenerator and is not to be considered a limitation of the present invention.

A portion of the regenerated catalyst at an elevated temperature of at least 1200° F. is recycled by the catalyst pressure head developed in the annular zone 49 for admixture with the spent catalyst passing from the riser 34 into the combustion section. The amount of recycle of regenerated catalyst for admixture with spent catalyst is essentially self-controlling, once certain operating flow characteristics are established in the process, such as the catalyst flow rate to the hydrocarbon conversion zone (the reactor vessel), catalyst make-up rate to the operation, and the flow rate of the suspension passing upwardly through riser 34 and combustion section 40 of the regenerator. Thus, the suspension of catalyst being subjected to regenerating conditions passes through gradations of catalyst particle concentration or density for given volume within the range of about 35 lbs/ft$^3$ to about 10 lbs/ft$^3$. Consequently, the combustion section 40 is not necessary to maintain a dense fluid bed of catalyst with a significant interface between a more dispersed phase of catalyst above the combustion section. On the other hand, the upflowing mass of catalyst may be maintained relatively uniform in density until it encounters the conical head section and radiating discharge arms which accelerate the flow of the suspension and thus reduce the particle concentration per given volume.

Regenerated catalyst collected in the annulus or a section of the annulus, or a portion of the regenerated catalyst discharged by the arms 48, is withdrawn by a standpipe 6 for passage to the riser hydrocarbon conversion zone 4. As mentioned above, the standpipe 6 is equipped with a control valve 8, operated by a control loop comprising the thermocouple 7 and the controller 9 connected to the valve 8. The function of the thermocouple 7 and the controller 9 is to assure that the temperature of the mixture of hydrocarbon products and stripping gas withdrawn through the conduit 28 does not exceed a limit allowable for downstream processing of the hydrocarbon products, e.g., about 1000° F. Thus, if the temperature sensed by the thermocouple 7 exceeds that limit, the opening of the valve 8 is decreased, thereby decreasing the rate of flow of hot regenerated catalyst into the riser 4 and decreasing the temperature of the hydrocarbon products exiting through the conduit 28. Conversely, if the temperature sensed by the thermocouple is lower than the 1000° F. set point of the controller 9, the opening of the valve 8 is increased, thereby allowing for higher rate of flow of the regenerated catalyst into the riser 4, resulting in a higher conversion ratio and higher temperatures sensed by the thermocouple 7.

It will be obvious to those skilled in the art that the FCC process and the apparatus of this invention are equipped with a number of other control loops conventionally used in the FCC installations and that the operation of these conventional control loops can be integrated with and/or can be kept independent of the operation of the control loop for regenerated catalyst. Such conventionally used control loops are fully disclosed in the patents and publications cited above.

Thus, for example, the embodiment of FIG. 1, discussed in detail above, includes a conventional control loop (disclosed, e.g., in U.S. Pat. No. 4,093,537) controlling the rate of air flow into the regenerator. Such control loop includes a composition sensor 29 which indicates the carbon monoxide and oxygen content of the flue gas, and generates a signal indicative of that composition. Valve 21 is commonly controlled by operator intervention to control the flow of air and thus the CO and oxygen content of the flue gas. Alternatively, the signal generated by composition sensor 29 is transmitted to the composition controller 25. Controller 25, equipped with set points 27, places a signal on line 23, which signal is indicative of the deviation of the carbon monoxide composition of the flue gas from the set point 27 to adjust the control valve 21 in a direction to reduce the deviation of the measured composition from the predetermined composition as defined by the set point 27. In general, the set point is adjusted to a CO content less than 2000 ppm and the flue gas, in general, will contain about 2 percent excess oxygen gas.

flow reactor (CCU) with those of a co-current downflow reactor (CCD). A bench scale riser reactor was used in the experiment.

In the CCU mode, preheated oil and catalyst contact each other at the mixing 'y', as in a conventional prior art riser, and the oil vapor lifts the catalyst and accelerates it essentially from rest in the initial reactor section. The CCD configuration of the riser was accomplished by removing the mixing y section and adding a specially designed U-shaped assembly to the riser so that catalyst movement and its initial acceleration at the reactor entrance were aided by gravity. The addition of the new section resulted in a slight increase (~2 percent) in the overall riser length.

Hydrocarbon feedstock A and clean-burned conventional zeolite FCC catalyst obtained during a previous refinery run were used as feed. Some feed properties are listed in Table 1.

TABLE 1

| Chargestock and Catalyst Properties | | | | | |
|---|---|---|---|---|---|
| A. Feedstock A | | | | Distillation | |
| TBP Fraction | 650° F.− | 650° F.+ | Total | (Vol %) | (°F.) |
| Yield (wt. pct.) | 9.09 | 90.91 | 100.0 | IBP | 481 |
| Physical Properties | | | | | |
| API Gravity | 29.4 | 20.3 | 21.4 | 5 | 602 |
| Specific Gravity at 60° F. | 0.8793 | 0.9321 | 0.9254 | 10 | 664 |
| Molecular Weight | 231 | 391 | 365 | 20 | 722 |
| Sulfur (wt. pct.) | 1.56 | 2.40 | 2.08 | 30 | 758 |
| Nitrogen (wt. pct.) | | | 0.20 | 40 | 786 |
| Aniline Point (°F.) | | | 171.6 | 50 | 809 |
| Bromine Number | | | 4.4 | 60 | 832 |
| Hydrogen (wt. pct.) | | | 11.48 | 70 | 858 |
| Pour Point (°F.) | | | 105 | 80 | 892 |
| Conradson Carbon Residue | | | | 90 | 937 |
| (wt. pct.) | | | 0.42 | 95 | 946 |
| Sodium (ppm) | | | 1.2 | | |

From the foregoing description of the invention, it is believed that one skilled in the art will be able to adopt it to various conditions and processes. Accordingly, the following comparative example is presented herein for illustrative purposes only and it is not to be considered as a limitation of the scope of the invention.

Cracking responses at 30 psig reactor pressure were obtained at two levels of oil preheat temperatures (600° and 900° F.) for both CCU and CCD operating modes. Weathered syncrudes were distilled to obtain the corresponding 430° F. EP gasoline fractions for mini-micro octane (R+O) evaluation.

EXAMPLE

A bench-scale pilot plane unit was used to compare cracking yields of feed and gasoline octane quality of the product obtained in a conventional co-current up-

DISCUSSION OF RESULTS

Summaries of run conditions, detailed cracking yields and $C_5$/430° F. gasoline octanes are set forth in Tables 2, 3, and 4.

TABLE 2

| Riser Acceleration Studies: Summary of Cracking Data for 600° F. Oil Preheat Level | | | | | | | | | | |
|---|---|---|---|---|---|---|---|---|---|---|
| | ← Co-Current Upflow (CCU) → | | | | | ← Co-Current Downflow (CCD) → | | | | |
| Oil Residence Time (Sec) | 5.26 | 5.42 | 5.31 | 5.21 | 5.07 | 5.20 | 5.24 | 5.29 | 5.18 | 5.36 |
| Cat/Oil (Wt/Wt) | 4.35 | 5.55 | 4.76 | 5.05 | 5.47 | 4.63 | 5.59 | 4.64 | 4.70 | 5.44 |
| Calcd. Mix Temp. (°F.) | 941.3 | 970.4 | 980.2 | 987.1 | 992.7 | 962.5 | 988.5 | 953.2 | 970.1 | 994.1 |
| Cracking Yields (Wt. Pct.) | | | | | | | | | | |
| Conversion | 58.50 | 61.59 | 60.34 | 63.33 | 64.94 | 61.06 | 66.41 | 62.10 | 61.08 | 65.05 |
| C5/430 Gasoline | 40.91 | 42.36 | 43.87 | 42.17 | 42.20 | 41.54 | 43.78 | 42.83 | 42.22 | 43.86 |
| C4's | 5.81 | 6.06 | 5.08 | 7.21 | 7.92 | 6.92 | 7.41 | 6.55 | 6.46 | 6.76 |
| Dry Gas | 7.15 | 7.39 | 6.27 | 8.50 | 8.91 | 7.55 | 9.09 | 7.59 | 7.23 | 8.39 |
| Coke | 4.63 | 5.78 | 5.13 | 5.45 | 5.92 | 5.04 | 6.13 | 5.13 | 5.16 | 6.03 |
| | | 85.9 | | | | | | 87.6 | | |
| C5+ Gasoline O.N. (R + O) | 86.3 | 86.4 | 87.5 | 87.5 | 88.8 | 87.9 | 88.3 | 88.9 | 88.1 | 88.3 |
| Hydrogen Factor | 59 | 61 | 88 | 70 | 66 | 81 | 67 | 85 | 83 | 70 |
| Cracking Yields (Vol. Pct.) | | | | | | | | | | |
| Conversion | 61.26 | 64.46 | 62.93 | 66.01 | 67.69 | 63.70 | 69.42 | 64.76 | 63.64 | 67.96 |
| C5/430 Gasoline | 49.90 | 51.76 | 53.99 | 51.53 | 51.65 | 50.68 | 53.55 | 52.22 | 51.57 | 53.62 |
| Gasoline Efficiency (Vol. Pct.) | 81.46 | 80.30 | 85.79 | 78.06 | 76.30 | 79.56 | 77.14 | 80.64 | 81.03 | 78.90 |
| Gasoline + Alkylate (Vol. Pct.) | 66.04 | 68.24 | 69.68 | 74.18 | 75.09 | 71.16 | 76.00 | 71.93 | 71.05 | 74.41 |

TABLE 3

Riser Acceleration Studies: Summary of Cracking Data for 900° F. Oil Preheat Level and Calculated $T_{mix} \sim 1035°$ F.

| | ← Co-Current Upflow (CCU) → | | | | ← Co-Current Downflow (CCD) → | | | | |
|---|---|---|---|---|---|---|---|---|---|
| Oil Residence Time (Sec) | 5.42 | 5.35 | 5.30 | 5.26 | 5.37 | 5.30 | 5.21 | 5.22 | 5.40 |
| Cat/Oil (Wt/Wt) | 5.92 | 5.75 | 5.82 | 5.16 | 5.30 | 4.51 | 4.36 | 5.18 | 5.23 |
| Calcd. Mix Temp. (°F.) | 1043.7 | 1042.4 | 1043.1 | 1045.6 | 1028.2 | 1025.1 | 1026.2 | 1029.9 | 1029.0 |
| Cracking Yields (Wt. Pct.) | | | | | | | | | |
| Conversion | 67.68 | 65.60 | 66.22 | 63.00 | 66.37 | 63.55 | 61.34 | 64.42 | 65.62 |
| C$_5$/430 Gasoline | 43.71 | 42.65 | 43.39 | 42.67 | 43.90 | 43.80 | 43.30 | 45.07 | 44.41 |
| C$_4$'s | 8.16 | 8.55 | 7.80 | 6.91 | 7.94 | 6.99 | 6.06 | 6.71 | 7.41 |
| Dry Gas | 8.71 | 8.38 | 8.71 | 7.81 | 8.40 | 7.79 | 7.22 | 7.26 | 8.14 |
| Coke | 7.10 | 6.03 | 6.33 | 5.61 | 6.12 | 4.96 | 4.76 | 5.39 | 5.66 |
| | | | | | 88.2 | | | | |
| C$_5^+$ Gasoline O.N. (R + O) | 88.1 | 87.8 | 87.8 | 88.4 | 88.7 | 88.9 | 88.3 | 89.0 | 88.2 |
| Hydrogen Factor | 45 | 63 | 62 | 66 | 74 | 69 | 70 | 63 | 69 |
| Cracking Yields (Vol. Pct.) | | | | | | | | | |
| Conversion | 70.35 | 68.43 | 69.18 | 65.71 | 69.27 | 66.39 | 64.08 | 67.49 | 68.57 |
| C$_5$/430 Gasoline | 53.71 | 52.29 | 53.15 | 52.14 | 53.73 | 53.50 | 52.83 | 55.06 | 54.39 |
| Gasoline Efficiency (Vol. Pct.) | 76.35 | 76.41 | 76.83 | 79.35 | 77.57 | 80.58 | 82.44 | 81.58 | 79.32 |
| Gasoline + Alkylate (Vol. Pct.) | 75.79 | 74.62 | 75.11 | 72.66 | 76.59 | 74.37 | 71.46 | 74.70 | 74.76 |

TABLE 4

Riser Acceleration Studies: Summary of Cracking Data for 900° F. Oil Preheat Level and Calculated $T_{mix} \sim 990°$ F.

| | ← Co-Current Downflow → | | | | ← Co-Current Upflow → | | |
|---|---|---|---|---|---|---|---|
| Oil Residence Time (Sec) | 5.39 | 5.84 | 5.50 | 5.30 | 5.26 | 5.25 | 5.31 |
| Cat/Oil (Wt/Wt) | 4.65 | 3.27 | 5.36 | 5.45 | 5.25 | 5.33 | 5.04 |
| Calcd. Mix Temp. (°F.) | 1003.4 | 980.8 | 987.6 | 988.4 | 994.3 | 995.0 | 992.5 |
| Cracking Yields (Wt. Pct.) | | | | | | | |
| Conversion | 62.67 | 49.47 | 65.08 | 65.81 | 64.89 | 65.20 | 64.61 |
| C$_5$/430 Gasoline | 43.52 | 35.48 | 44.62 | 43.25 | 43.41 | 43.15 | 44.15 |
| C$_4$'s | 6.57 | 4.72 | 7.27 | 7.89 | 7.46 | 7.58 | 7.47 |
| Dry Gas | 7.28 | 5.81 | 7.29 | 8.96 | 8.34 | 8.70 | 7.77 |
| Coke | 5.30 | 3.46 | 5.91 | 5.71 | 5.67 | 5.77 | 5.21 |
| C$_5^+$ Gasoline O.N. (R + O) | 87.5 | 88.1 | 86.9 | 87.6 | 87.1 | 86.7 | 86.8 |
| Hydrogen Factor | 64 | 41 | 65 | 62 | 61 | 57 | 63 |
| Cracking Yields (Vol. Pct.) | | | | | | | |
| Conversion | 65.39 | 51.24 | 67.95 | 68.57 | 67.70 | 68.14 | 67.43 |
| C$_5$/430 Gasoline | 53.14 | 43.11 | 54.64 | 53.04 | 53.22 | 52.94 | 53.95 |
| Gasoline Efficiency (Vol. Pct.) | 81.27 | 84.13 | 80.41 | 77.35 | 78.61 | 77.69 | 80.01 |
| Gasoline + Alkylate (Vol. Pct.) | 71.63 | 57.25 | 75.46 | 76.85 | 74.06 | 75.22 | 73.90 |

Table 2 shows the comparative data for oil preheat temperature of 600° F., while Tables 3 and 4 include resuls for the 900° F. preheat level at calculated $T_{mix} \sim 1035°$ F. and 990° F., respectively. In the discussion which follows, each set of data (at 600° F. or 900° F. preheat level) is examined separately. Insofar as possible from an operational viewpoint, data within each set are internally consistent.

Figures 3A, 3B:
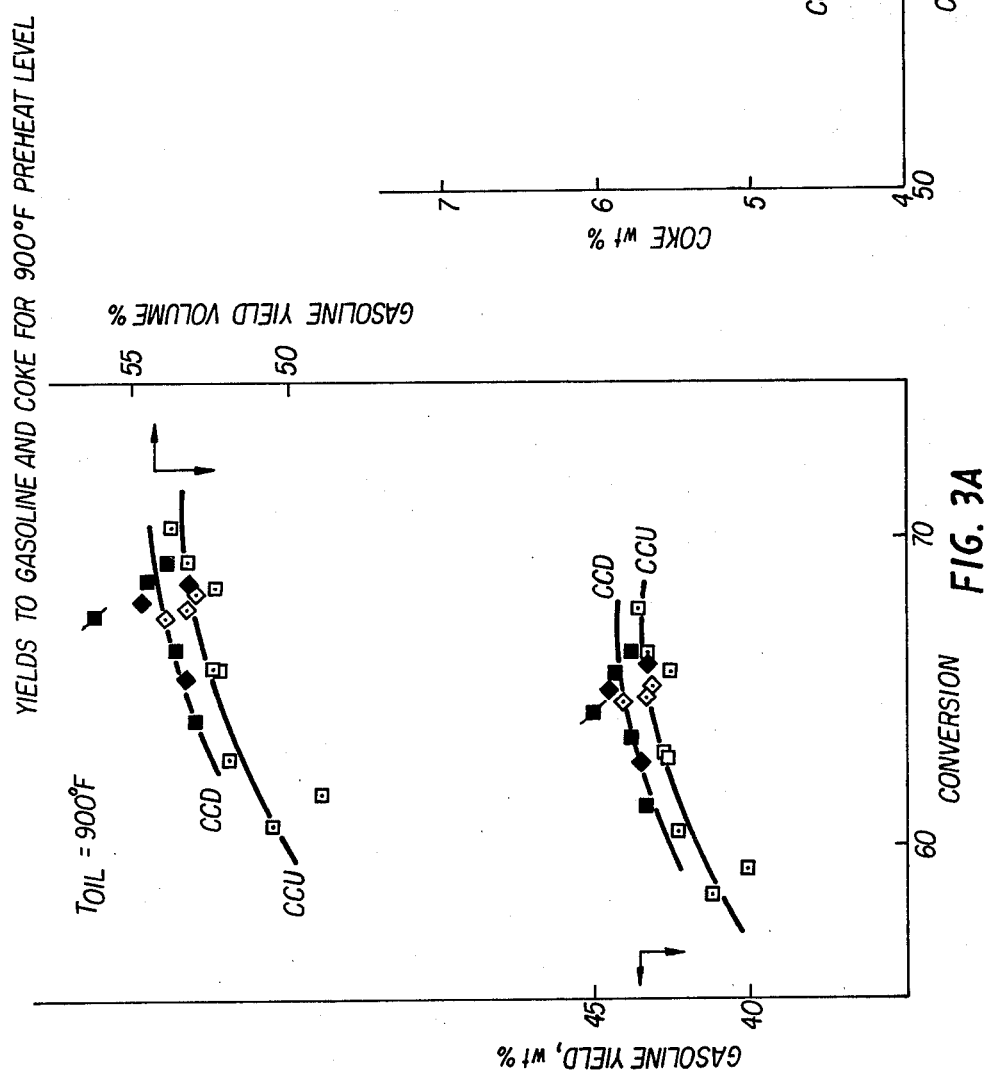
FIG. 3 is a comparative graph of gasoline and coke make of the co-current upflow (CCU) and co-current downflow (CCD) riser configurations at 900° F. oil preheat temperature.

Experimental results, shown graphically in FIGS. 2 and 3 for gasoline selectively (weight or volume basis) and coke make, clearly indicate an advantage for the CCD operation. For the 600° F. preheat level, gasoline yield at 63 weight percent conversion is approximately 0.5 percent higher (43.1 vs. 42.6 weight percent) and coke make is about 10 percent lower (5.38 vs. 5.92 weight percent). The corresponding values at 900° F. preheat level show very nearly the same percentage reduction in coke yield (5.15 vs. 5.72 weight percent) while the gain in gasoline yield is slightly higher, namely 0.8 weight percent (43.6 vs. 42.8 for CCU).

Figure 4A:
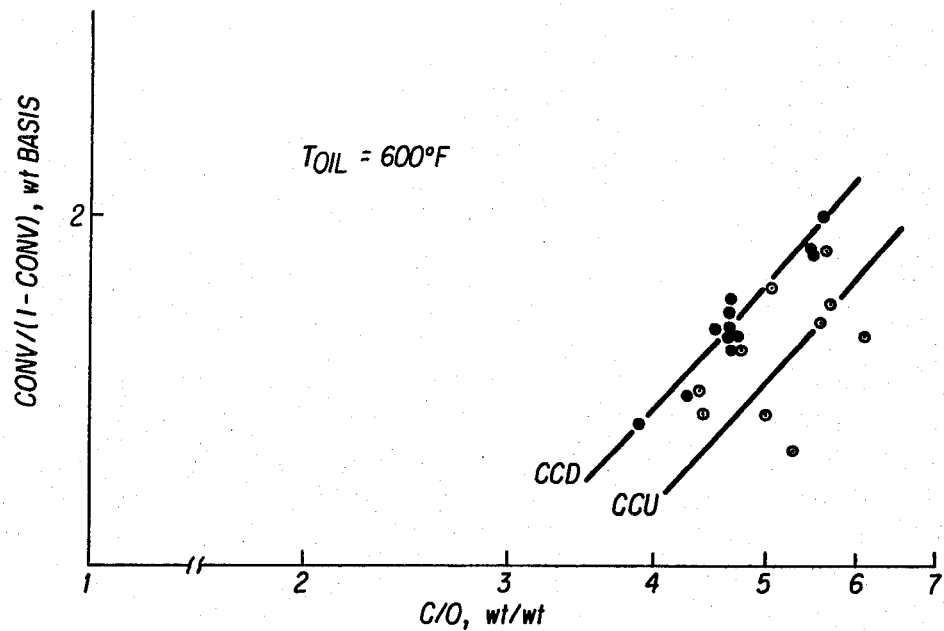
FIG. 4 is a comparative graph of conversion as a function of catalyst to oil ratio of the CCU and CCD riser configurations at 600° F. and 900° F. oil preheat temperatures.
Figure 4B:
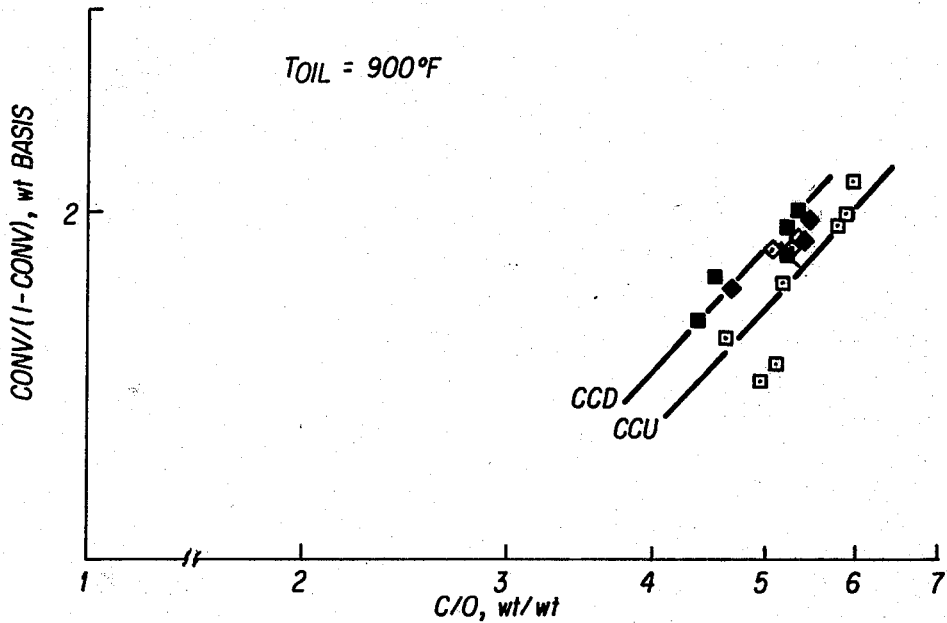

Logarithmic plots of crackability, conv/(1-conv), versus catalyst/oil ratio (C/O) in FIG. 4 for both 600° and 900° F. oil preheat show marked improvement in catalyst utilization for the co-current downflow case. For instance, for 66.7 weight percent conversion of the oil (conv/1-conv ~ 2), the required C/O's are: 6.8 (CCU) vs. 5.7 (CCD) at 600° F., and 6.0 (CCU) vs. 5.4 (CCD) at $T_{oil}=900°$ F., indicating between 10 and 15 percent lower catalyst requirement with the co-current downflow arrangement. These results clearly reflect more efficient oil/catalyst contacting with less backmixing that can be achieved with faster catalyst acceleration at the riser entrance.

Octane qualities (R+O) of the C$_5$/430° F. gasoline fractions, shown in FIG. 5, indicate little or no difference for the two modes of riser operation at 600° F. preheat level. For the 900° F. level, the downflow arrangement appears to yield gasolines which are about 0.3 to 0.4 clear octane better in quality than those for the upflow configuration.

The effect of lowering the calculated $T_{mix}$ from 1035° to 990° F. by lowering catalyst temperature (about 60° to 70° F.) at constant oil preheat, reduces the octane value by about one number. Both CCD and CCU operating modes, at 900° F. preheat level, indicate this trend.

Figure 6B:
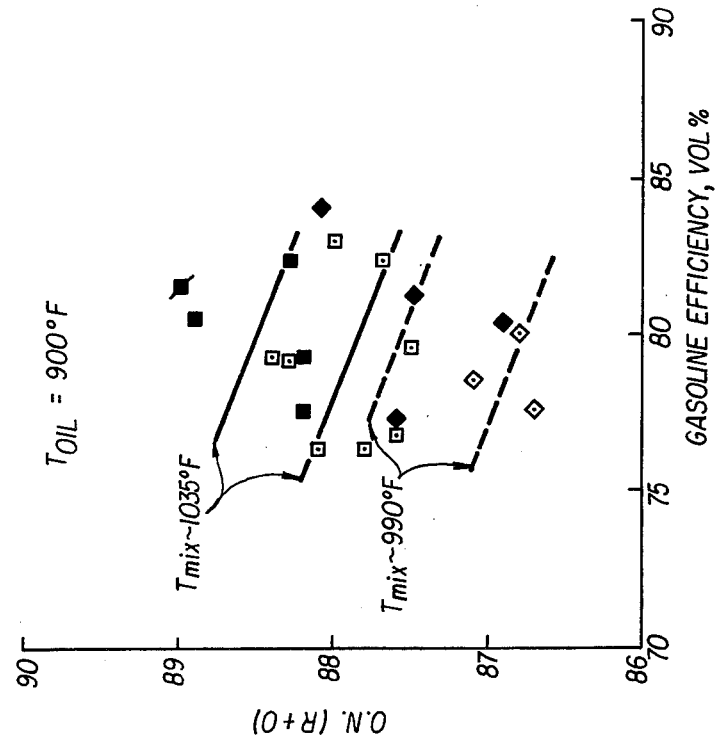
FIG. 6 is a comparative graph of octane number as a function of gasoline efficiency of gasoline produced with the CCU and CCD risers at 600° F. and 900° F. oil preheat temperatures.
Figure 6A:
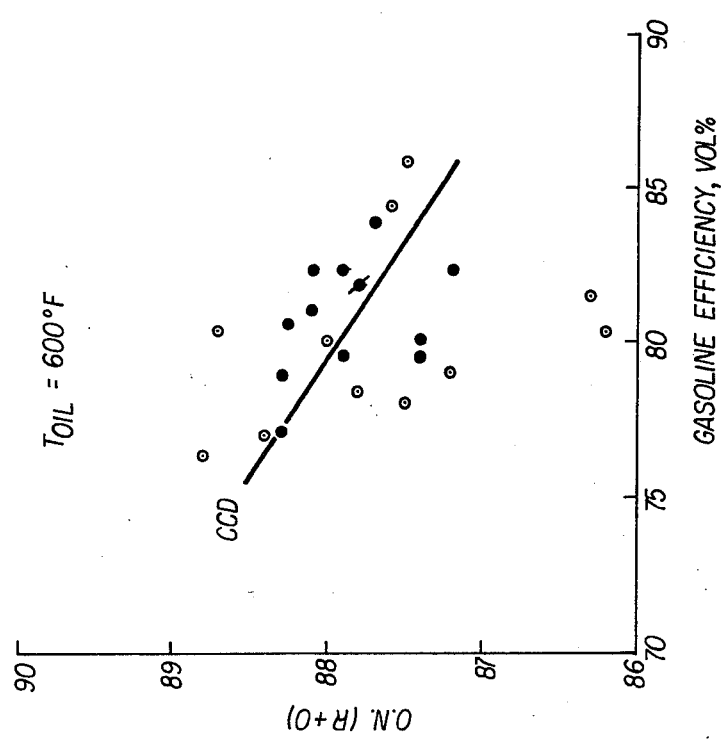

FIG. 6 is the plot of octane number against gasoline efficiency. The indicated trends corroborate the conclusions from FIG. 5 discussed above.

Figure 7B:
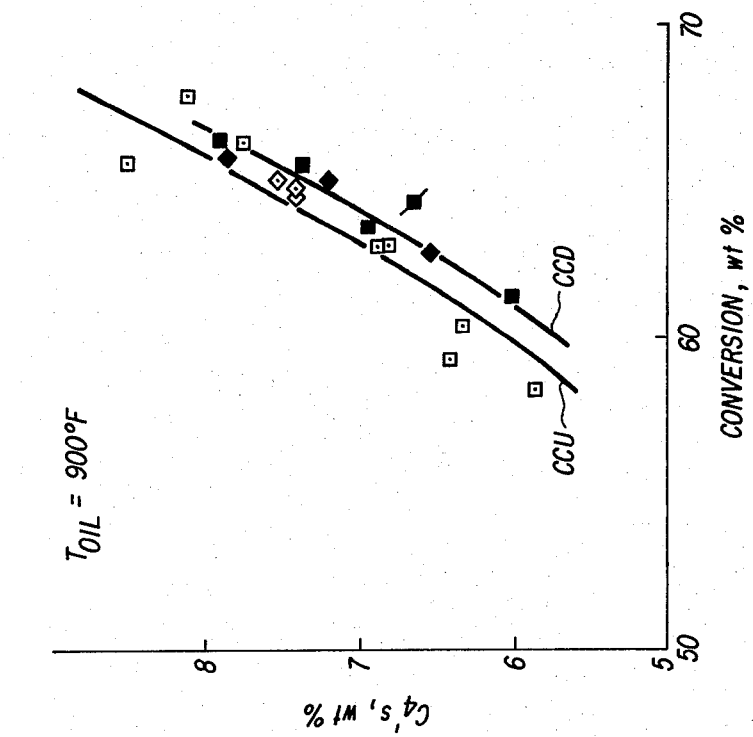
FIG. 7 is a comparative graph of $C_4$ yields as a function of oil feed conversion with the CCU and CCD risers at 600° F. and 900° F. oil preheat temperatures.
Figure 7A:
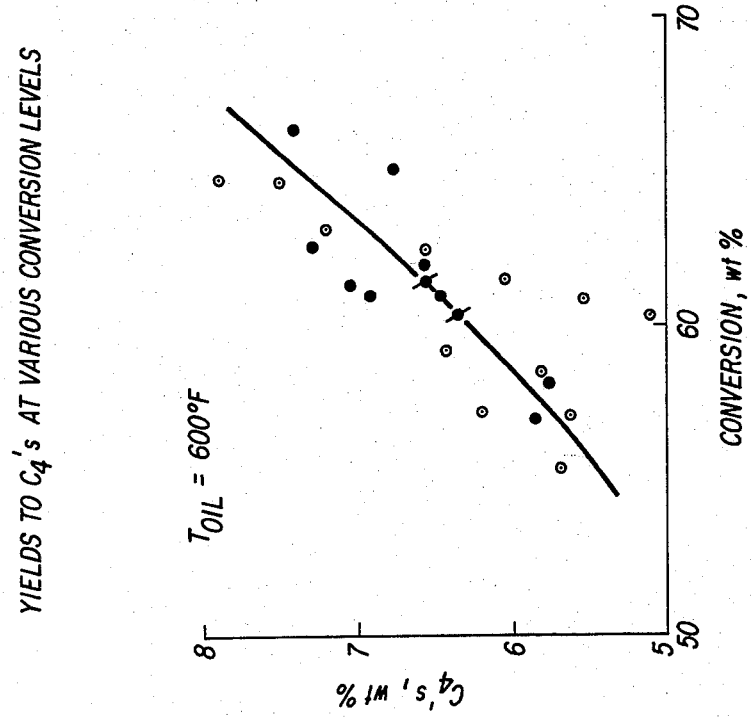
Figures 8A, 8B:
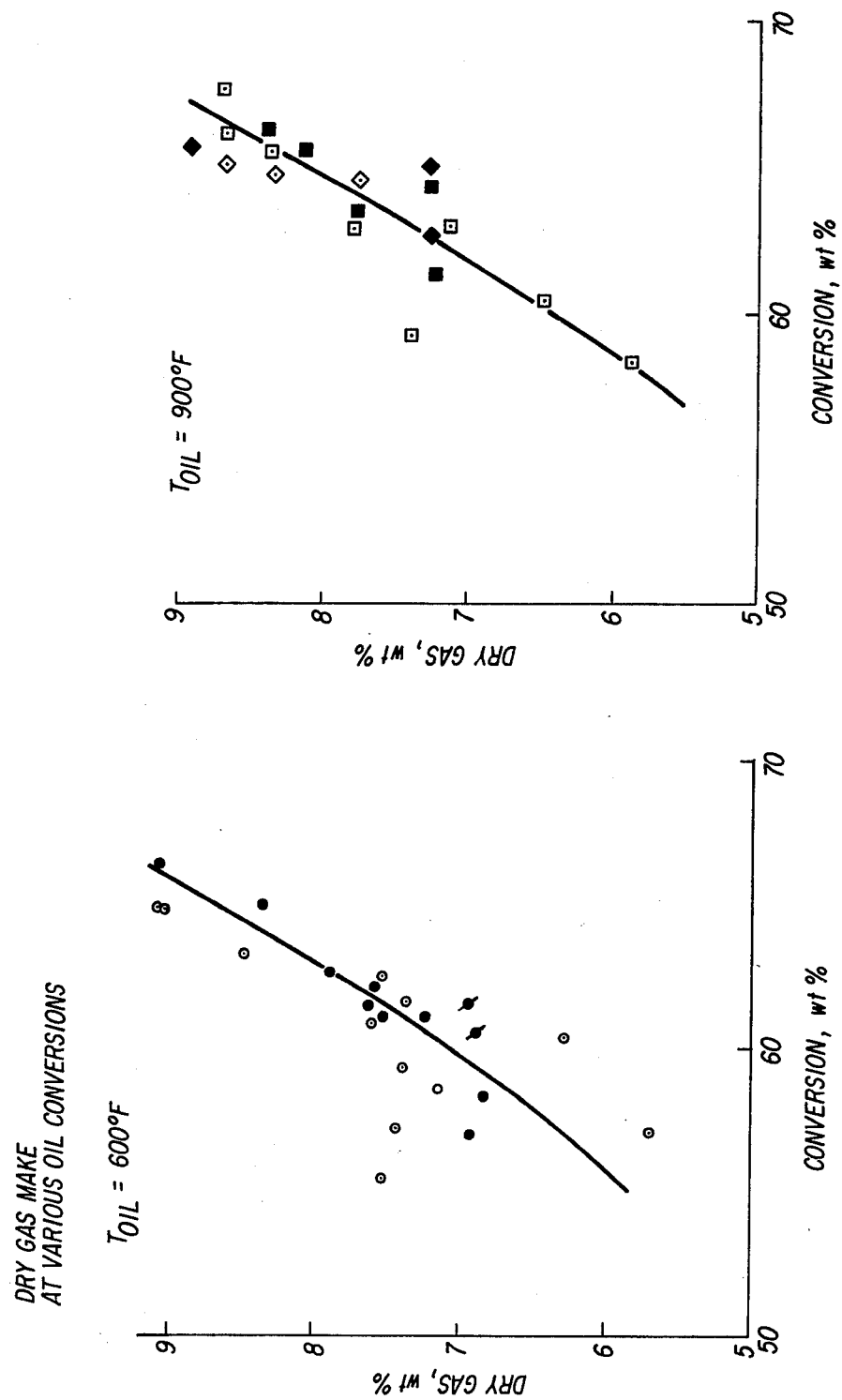
FIG. 8 is a comparative graph of dry gas make as a function of oil feed conversion with the CCU and CCD risers at 600° F. and 900° F. oil preheat temperatures.

Yields to C$_4$'s and dry gas make (FIGS. 7 and 8) show no detectable difference between the upflow and downflow arrangements at 600° F. preheat level. For the 900° F. level, results indicate the same trend for dry gas but show a slightly lower (4 to 5 percent) C$_4$'s yield for the CCD mode of operation. Table 5 below summarizes the experimental results of FIGS. 2 through 8.

TABLE 5

|  | Toil = 600° F. | | | Toil = 900° F. | | |
| --- | --- | --- | --- | --- | --- | --- |
|  | CCU | CCD | Δ | CCU | CCD | Δ |
| Gasoline Yield (Vol. Pct.) (at 65 vol. pct. conv.) | 51.7 | 52.2 | 0.5 | 52.3 | 53.2 | 0.9 |
| O.N. (R + O) | 88.0 | 88.0 | 0.0 | 88.0 | 88.4 | 0.4 |
| Coke (wt. pct.) (at 63 wt. pct. conv.) | 5.92 | 5.38 | −0.54 | 5.72 | 5.15 | −0.57 |
| C/O Required (for 66 pct. conv.) | 6.8 | 5.7 | −1.1 | 6.0 | 5.4 | −0.6 |
| Conv. (wt. pct. for C/O = 5.5) | 61.3 | 65.8 | +4.5 | 64.5 | 67.1 | +2.6 |

Figure 9A:
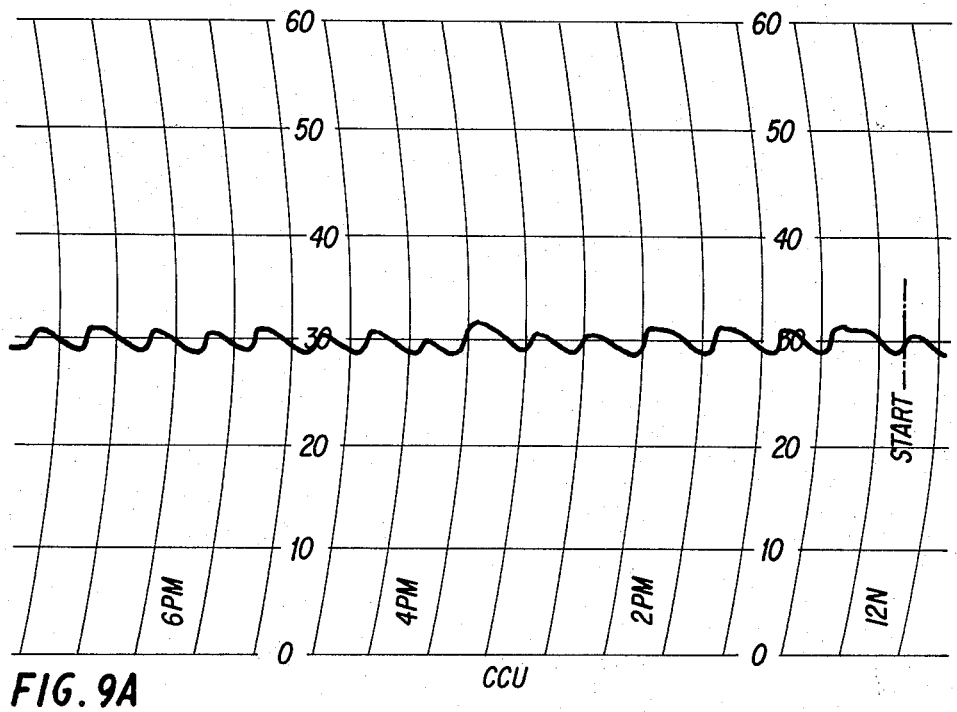
FIG. 9 is a recording of riser inlet pressure as a function of time for the CCD and CCU risers.
Figure 9B:
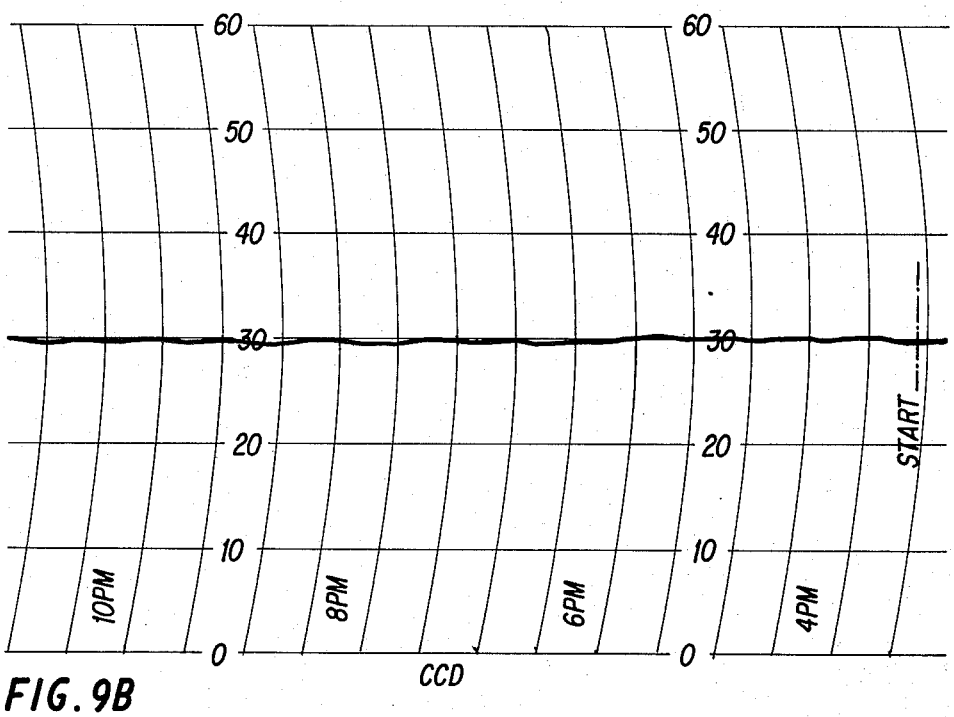

Recorder tracings of reactor inlet pressures for a typical CCU run and a CCD run are shown in FIG. 9. As can be seen from this demonstration, the operation of the pilot unit with the downflow riser entrance was smooth and stable. In contrast, pressure oscillations due to choking and/or clogging of the catalyst at the riser entrance ("bath tub" effect) were frequent with the upflow configuration. Thus, cracking responses (conversion, gasoline yield etc.) obtained in the CCU runs, because of the resulting fluctuations in catalyst flow, were subject to varying degrees of insidious, "time-averaging" penalties.

A review of the experimental data shown in FIGS. 2 through 8, and summarized in Table 5, also indicates a larger scatter in the observed responses for the co-current upflow configuration. In general, the CCU data points indicating lower coke make and/or better gasoline yield were obtained in runs with greater pressure stability which in many cases could be achieved only with higher nitrogen dilution introduced through the catalyst feed line.

From the foregoing specification, one skilled in the art can readily ascertain the essential features of this invention and without departing from the spirit and scope thereof can adopt it to various diverse applications.

What is claimed is:

1. In a fluid catalytic cracking process comprising admixing a hydrocarbonaceous feed with a regenerated catalyst in a substantially vertically-positioned transport reactor of a reactor vessel, passing the hydrocarbonaceous feed and the catalyst admixed therewith through the transport reactor, thereby effecting cracking of the hydrocarbonaceous feed at the process temperature under endothermic process conditions and deactivating the catalyst by deposition of carbon-containing material thereon, separating the deactivated catalyst from the cracked hydrocarbonaceous feed, passing the deactivated catalyst to a regenerator vessel wherein the carbon-containing material is removed from the deactivated catalyst, thereby regenerating and heating the catalyst, and passing the regenerated hot catalyst to the transport reactor, the improvement wherein:

the hydrocarbonaceous feed is admixed with the regenerated catalyst in the top section of the transport reactor attached to the top section of the reactor vessel, thereby forcing the catalyst to flow in a substantially downward direction in the transport reactor and maintaining transport reactor inlet pressure substantially constant;

maintaining the admixture of the feed and the catalyst in the transport reactor for 0.2 to 10 seconds, thereby deactivating the catalyst;

regenerating the deactivated catalyst in a regeneration vessel physically separated and distinct from the reactor vessel, the regeneration method comprising forming a suspension of deactivated catalyst particles in a gaseous material passing upwardly through a regeneration vessel cylindrical combustion zone, recovering regenerated catalyst in an annular zone of the regeneration vessel, surrounding the cylindrical zone, passing the regenerated catalyst from the bottom of the annular zone into admixture with the catalyst suspension passing into the cylindrical combustion zone, passing the thus-formed admixture of the regenerated and the deactivated catalyst particles upwardly through the combustion zone to burn the carbon-containing material and heating the catalyst particles to a temperature above about 1200° F., thereby regenerating the deactivated catalyst particles, passing at least a portion of the regenerated catalyst particles to the top section of the transport reactor, and maintaining a catalyst head of pressure between the annular zone and the cylindrical zone of the regeneration vessel to maintain a flow of the remaining hot regenerated catalyst from the annular zone into the bottom open end of the cylindrical zone to form the admixture of the regenerated and the deactivated catalyst particles.

2. A process according to claim 1 wherein the hydrocarbonaceous feed is introduced into the transport reactor at a point immediately downstream of the point of introduction of the regenerated catalyst into the transport reactor.

3. A process according to claim 2 wherein the deactivated catalyst is passed from the reactor vessel to the regenerator vessel in a downward direction.

4. A process of claim 3 wherein the hydrocarbonaceous feed is a heavy feedstock characterized by the endpoint of greater than 1050° F., Conradson Carbon Residue of 3% or more, and the content of multi-ring aromatic compounds of more than about 15%.

5. A process of claim 4 wherein the hydrocarbonaceous feed is Arab heavy oil, hydrotreated vacuum resids or gas oils.

6. A process of claim 5 wherein the catalyst contains a carbon monoxide burning promoter selected from the group consisting of platinum, palladium, rhodium, ruthenium, iridium, osmium and rhenium.

7. A process of claim 3 wherein the superficial velocity of the hydrocarbonaceous feed in the transport reactor is about 5 to about 50 ft/sec.

8. A process of claim 7 wherein the admixture of the feed and the catalyst is maintained in the transport reactor for 0.3 to 4 seconds.

9. A process of claim 8 wherein the admixture of the feed and the catalyst is maintained in the transport reactor for 0.4 to 2 seconds.

* * * * *

UNITED STATES PATENT AND TRADEMARK OFFICE
CERTIFICATE OF CORRECTION

PATENT NO. : 4,385,985

DATED : May 31, 1983

INVENTOR(S) : Benjamin Gross and Michael P. Ramage

It is certified that error appears in the above-identified patent and that said Letters Patent is hereby corrected as shown below:

Col. 2    Line 15   Change "relaively" to --relatively--

Col. 11-12  Table 3, line 13, Col. 3   Change "87.8" to --87.6--

Signed and Sealed this

Thirty-first Day of July 1984

[SEAL]

Attest:

Attesting Officer

GERALD J. MOSSINGHOFF

Commissioner of Patents and Trademarks